United States Patent [19]

Kanode

[11] 3,892,491
[45] July 1, 1975

[54] COMPARATOR, OPTICAL INSPECTION

[75] Inventor: Albert E. Kanode, Longwood, Fla.

[73] Assignee: The United States of America as represented by the Secretary of the Army, Washington, D.C.

[22] Filed: July 2, 1974

[21] Appl. No.: 485,175

[52] U.S. Cl. .............. 356/168; 356/71; 356/165; 356/166; 350/30
[51] Int. Cl. ........................................ G01b 11/24
[58] Field of Search ............ 356/168, 165, 166, 71, 356/237; 350/30

[56] References Cited
UNITED STATES PATENTS 2,040,066    5/1936    Ursinus .............................. 350/30
3,753,617    8/1973    Ehrat ............................. 356/168 X Primary Examiner—Ronald J. Stern
Assistant Examiner—Paul K. Godwin
Attorney, Agent, or Firm—Lawrence A. Neureither; Joseph H. Beumer; Robert C. Sims

[57] ABSTRACT

Two identical thin lenses are placed side by side and in the same plane level above work being examined which is located at approximately the lenses focal length. Observer's eye is at a controlled center between the lenses and at a distance about double their focal length. Observer sees alternately two magnified images of the work with one eye, so as to compare a standard with a sample.

1 Claim, 5 Drawing Figures

PATENTED JUL 1 1975 3,892,491

SHEET 1

3,892,491

COMPARATOR, OPTICAL INSPECTION

BACKGROUND OF THE INVENTION

This invention is directed to the field of optical comparators where one optically compares a sample with a standard. Prior art method of comparing was mainly "eyeballing comparison" — viewing module with eyeloop and then looking at negative of circuit. This method is unpredictable and tiring. Also the method of placing the negative on top of the module to be compared suffered from the fact that solder could not be uniformly illuminated and film haze resulted in doubt of what was being viewed relative to the solder bridging.

SUMMARY OF THE INVENTION

The comparator consists basically of two good grade positive thin lens which are identical and are placed side by side within 0.060 inches. Lenses are in the same plane level above the work being examined. Work being examined is at approximately the focal length of the lenses. The observer's eye is at a controlled center between the lenses and at a distance about double their focal lengths. Observer sees alternately two magnified images with one eye. Images appear to be side by side for easy comparison. The work consists of a standard and a sample being placed side by side. When one lens is looked through by the observer, an area on the standard is seen, and when the observer looks through the other lense, a corresponding area is seen on the sample. The standard and the sample are moved together such that the whole area of the sample can be compared with the whole area of the standard.

DESCRIPTION OF THE PREFERRED EMBODIMENT

Figure 1:
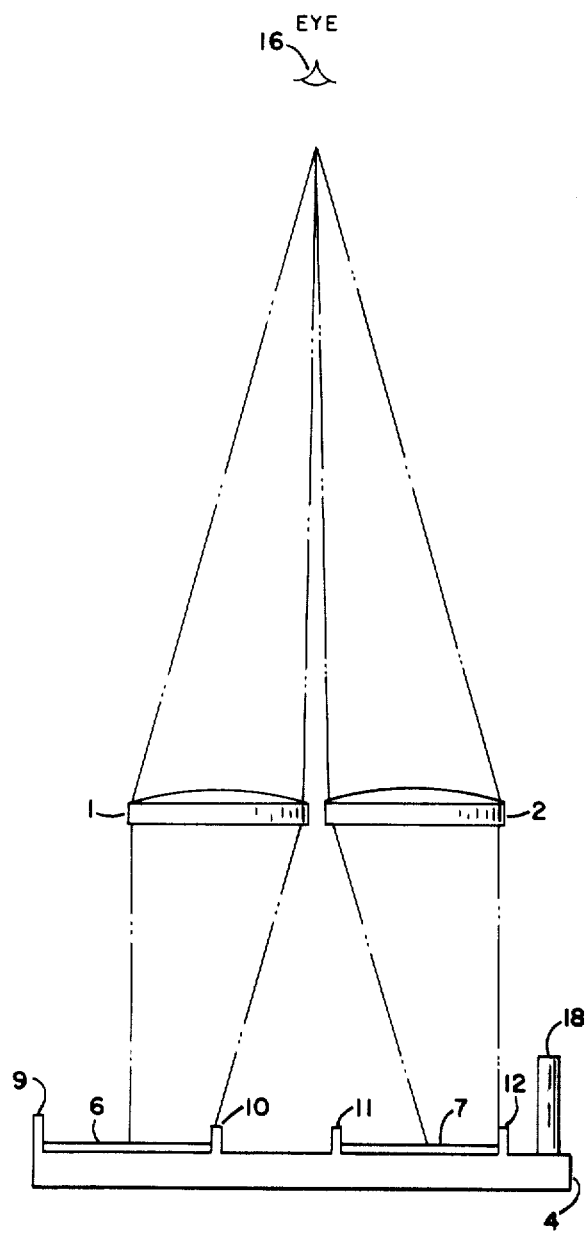
FIG. 1 shows a diagrammatic illustration of the present invention.
Figure 2:
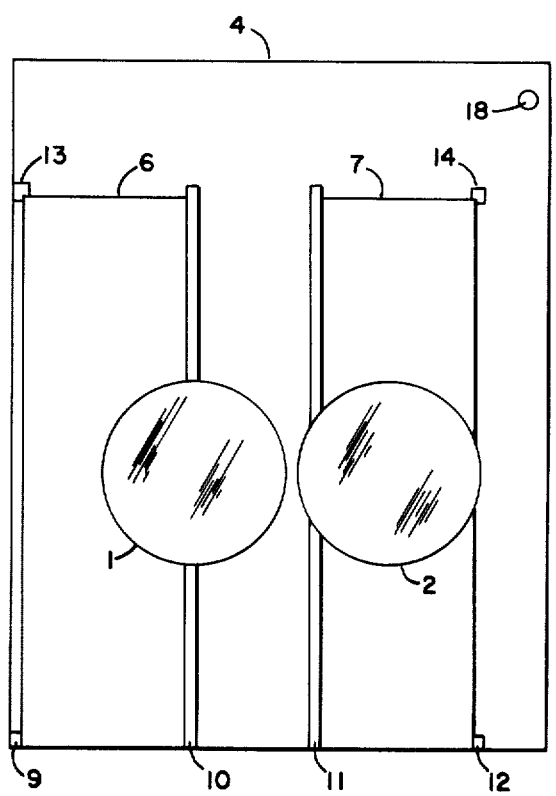
FIG. 2 shows a top view of the diagrammatic showing of FIG. 1.
Figures 3, 5:
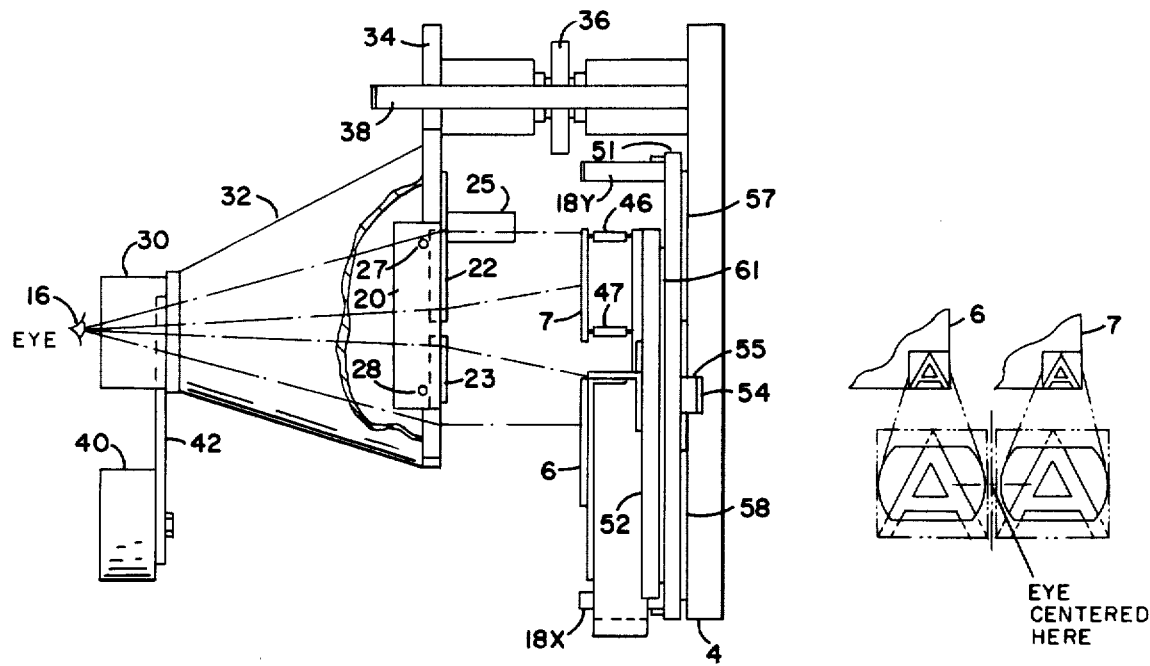
FIG. 3 is an illustration showing what is magnified by the two lenses.
FIG. 5 shows a side view of FIG. 4 partially cut away.

FIGS. 1, 2 and 3 show the basic operation of the present invention. The comparator has two identical lenses 1 and 2 which are placed side by side within 0.060 inches. Lenses can be two element achromats or any good quality single element convex or positive meniscus lenses. Lenses may also be of the simple thin planoconvex positive glass or plastic type with flat side toward objects to be viewed. Thin achromats may be used if color correction is necessary.

A base board is provided for holding the work to be reviewed. The work consists of a standard 6 which is positioned on the base board along side a sample 7. Work being compared could be such small objects as stamps, coins, signatures, electronic circuit boards, currency, etc. Standard 6 could be a film showing the desired configurations to which the sample should conform, or an approved model; a perfect end product; etc. Locators 9–14 secure standard 6 and sample 7 to base board 4 in a predetermined spacial manner and in the same plane.

Lenses 1 and 2 are in the same plane level parallel above the plane of work being examined. Work 6 and 7 are examined approximately at the focal length of the lenses. Observer's eye 16 is at a controlled center between the lenses and at a distance about double their focal lengths. Observer sees alternately two magnified images with one eye by shifting the angle of view of his eye. The images appear to be side by side for easy comparisons. The eye sweep angle measured from center eye position to center of each does not exceed 30°.

Observer will see identical strip areas of sample 7 and standard 6 magnified approximately five times. This is graphically shown in FIG. 3 which shows at the top part the particular identical areas which are to be compared (areas containing the "A"). At the bottom part of FIG. 3 is shown what the eye will see.

The comparator could be designed such that it may adapt to optical magnifying powers from approximately two to ten powers by the use of suitable twin lenses having identical focal lengths and diameters. An eyepiece can be located in the area of the eye 16 so as to position the eye to see the alternate views shown in FIG. 3. Mounts could be provided for lenses 1 and 2 which have simultaneous focusing capabilities related to the objects being viewed.

In FIGS. 1 and 2 the knob 18 is provided for moving the work area beneath the lenses 1 and 2. The comparator is normally used with eye movements in a lateral direction, i.e., left or right from one lens to the other. However, the comparator may also be used with viewer positioned 90° to lateral, so that eye movement is up or down; forward and aft to each lens. This latter position is suited for inspecting long identical objects such as strip materials which could interfere with the viewer's body, where he at the lateral viewing position. The eye sweep angle measured from center eye position to center of each lens does not exceed 30°.

Figure 4:
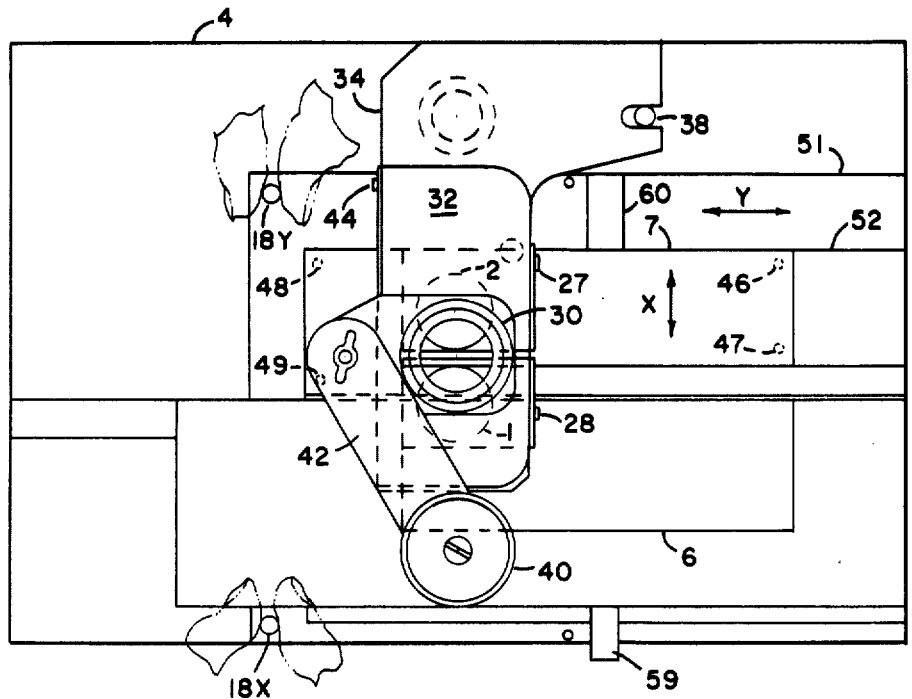
FIG. 4 shows a top view of a specific structure implementing the present invention.

Basic invention shown in FIGS. 1 and 2 may be practically constructed in a number of ways. One preferred specific construction of a comparator which will utilize the invention is shown in FIGS. 4 and 5. Where there is correspondence between the two sets of figures, like numbers are used. Lenses 1 and 2 are held by a lens holder 20 and frames 22 and 23 which provide for positioning of lenses 1 and 2. Knob 25 is provided for movement of lens 2 in a X direction. Lockscrews 27 and 28 are provided for locking in the frames 22 and 23 relative to the lens holder 20. Eyepiece 30 is positioned by a hood assembly 32 to a frame assembly 34. The optical frame assembly is attached to the base 4 by way of a focusing wheel 36. A bar 38 is provided for support.

An eye cover 40 is provided for the unused eye. It is attached to the hood assembly by a swing arm 42. Hood assembly 32 is attached to frame assembly 34 by screws 27, 28 and 44.

Unit 7 to be compared is located in proper position by locating pins 46, 47, 48, and 49. The standard 6 is mounted by any of the known means such as clips not shown. To provide for X and Y movement of the work to be compared relative to the lens assembly, plate assemblies 51 and 52 are provided. Plate assembly 51 will provide movement in the designated Y axis, and plate 52 will provide movement in the designated X axis.

Plate assembly 51 is slideably attached to base member 4 by a slot and tongue arrangement 54 and 55. Felt pads 57 and 58 are provided for smooth movement.

With the use of knob 18Y, plate assembly 51 is moveable in the Y direction. Movement in this direction by plate assembly 51 causes plate assembly 52 to also move. Since sample 6 and unit 7 to be compared are fixedly located on plate assembly 52, they also make the same movement.

Plate assembly 52 has the same slot and groove arrangement with respect to plate 51 as plate 51 had with respect to base 4. The slot and groove of plate assembly 52 is located 90° with respect to that of plate assembly 51. The tongue 59 and the groove 60 allow movement of knob 18X to cause movement of plate assembly 52 in the X direction, and therefore, movement of the work in this direction relative to the lens assembly. Felt pad 61 is provided so that smooth easy movement can be had relative to the two plate assemblies.

I claim:

1. A method of comparing a first object with a second object with the use of first and second lenses comprising the steps of aligning said first and second objects in predetermined spacial relationship to each other in a first plane; choosing first and second lenses which are identical in their optical and physical characteristics; aligning said first and second lenses in a second plane which is parallel to the first plane such that from a fixed point an image is formed due to the first lens which is a first portion of the first object and a second image is formed due to the second lens which is a portion of the second object which corresponds to said portion of said first object; placing said fixed point on a centerline between the two lenses and at a distance of double their focal lengths; locating said first and second planes at a distance equal to the focal length of the lenses; observing the two images alternately with a single observation means located at said fixed point; moving the plane of the first and second lenses relative to said first and second objects so as to provide for more precise focusing of the images to be viewed; moving the second lens in the second plane so as to provide precise alignment of the image of the portions of the second object with respect to the image of the portions of said first object viewed through said first lens; and moving said first and second objects simultaneously so that all corresponding portions of said first and second objects can be compared.

* * * * *